(12) United States Patent
Dobson et al.

(10) Patent No.: US 6,783,855 B1
(45) Date of Patent: Aug. 31, 2004

(54) RARE-EARTH-ACTIVATED PHOSPHORS

(75) Inventors: Peter James Dobson, Oxford (GB); Gareth Wakefield, Oxford (GB)

(73) Assignee: ISIS Innovation Limited, Oxford (GB)

( * ) Notice: Subject to any disclaimer, the term of this patent is extended or adjusted under 35 U.S.C. 154(b) by 0 days.

(21) Appl. No.: 09/868,054

(22) PCT Filed: Dec. 17, 1999

(86) PCT No.: PCT/GB99/04299

§ 371 (c)(1),
(2), (4) Date: Sep. 14, 2001

(87) PCT Pub. No.: WO00/36050

PCT Pub. Date: Jun. 22, 2000

(30) Foreign Application Priority Data

Dec. 17, 1998 (GB) ............................. 9827860
May 20, 1999 (GB) ............................. 9911781

(51) Int. Cl.[7] ............................. B32B 5/16; C01F 17/00
(52) U.S. Cl. .............................. 428/402; 252/301.4 R; 423/21.1; 423/50; 423/263; 423/579; 423/599; 428/403
(58) Field of Search ................................ 428/403, 402; 252/301.4 R; 423/21.1, 50, 263, 579, 599

(56) References Cited

U.S. PATENT DOCUMENTS

| 3,457,184 | A | | 7/1969 | Kobayashi, et al. |
| 3,668,143 | A | * | 6/1972 | Luckey |
| 4,032,471 | A | | 6/1977 | Luckey |

(List continued on next page.)

FOREIGN PATENT DOCUMENTS

| DE | 24 02 269 A1 | 7/1975 |
| DE | 42 10 153 A1 | 3/1992 |
| EP | 0 253 552 A2 | 1/1988 |

(List continued on next page.)

OTHER PUBLICATIONS

Sordelet et al., *J. Eur. Ceramic Soc.* 14: 123–130 (1994).
Giesche and Matijevic, *J. Mater. Res.* 9(2): 436–450 (1994).
Cho, et al., *Phys. Lett*, 71: (23), 3335–3337 (1997).
Bihari, et al., *J. Lumin.*, 75: 1–10 (1997).
Goldburt, et al., *J. Lumin.*, 72–74, 190–192, (1997).
Kobayashi, *J. Mat. Sci. Letters*, 11: 767–768, (Jun. 1992).
Phillips, et al., *27th Int. SAMPE Tech. Conf.*, 501–505 (Oct. 9–13, 1995).
Shea, et al., *J. Am. Cer. Soc.*, 79(12), 3257–3265 (Dec. 1996).
Sommerdijk, et al., *J. Lumin*, 5(4), Abstract Only, (1972).
Maestro P: & Al: Mixed Rare Earth Oxides as Starting Material for Preparation of Y2O3:EU Lamp Phosphor: Characterization and Use, Journal of the Electrochemical Society, 1992, vol. 139, No. 5, pp. 1479 to 1482.

*Primary Examiner*—H. Thi Le
(74) *Attorney, Agent, or Firm*—Wolf, Greenfield & Sacks, P.C.

(57) ABSTRACT

A process for preparing phosphor particles of a host oxide doped with a rare earth or manganese which comprises:
  preparing an aqueous solution of salts of the host ion and of the dopant ion and a water soluble compound which decomposes under the reaction conditions to convert said salts into hydroxycarbonate,
  heating the solution so as to cause said compound to decompose,
  recovering the resulting precipitate and
  calcining it at a temperature of at least 500° C.
Substantially monocrystalline particles can be obtained by this process.

25 Claims, 11 Drawing Sheets

U.S. PATENT DOCUMENTS

| | | |
|---|---|---|
| 5,250,366 A | 10/1993 | Nakajima et al. |
| 5,413,736 A | 5/1995 | Nishisu et al. |
| 5,518,808 A * | 5/1996 | Bruno et al. |
| 5,637,258 A | 6/1997 | Goldburt et al. |
| 5,985,176 A * | 11/1999 | Rao |
| 6,036,886 A * | 3/2000 | Chhabra et al. ......... 252/301.4 |

FOREIGN PATENT DOCUMENTS

| | | |
|---|---|---|
| EP | 0 684 072 A2 | 11/1995 |
| EP | 0 732 356 A2 | 9/1996 |
| FR | 2 677 139 A1 | 5/1992 |
| GB | 2 026 530 A | 2/1980 |
| GB | 2 084 395 A | 4/1982 |
| JP | 46031844 B4 | 9/1971 |
| JP | 63146981 A | 6/1988 |
| JP | 5279022 A | 10/1993 |
| JP | 5320637 A | 12/1993 |
| JP | 5279023 A | 2/1994 |
| JP | 6174854 A | 6/1994 |
| JP | 6322363 A | 11/1994 |
| JP | 7097211 A | 4/1995 |
| JP | 9188517 A | 7/1997 |
| NL | 1 458 700 | 12/1976 |
| NL | 8 202 824 A | 2/1983 |
| RU | 2008319 C1 | 2/1994 |
| WO | WO 82/03876 A1 | 11/1982 |
| WO | WO 96/01297 A1 | 1/1996 |
| WO | WO 97/35943 A1 | 10/1997 |
| WO | WO 98/10459 A1 | 3/1998 |
| WO | WO 99/46204 A1 | 9/1999 |
| WO | WO 00/36051 A1 | 6/2000 |

* cited by examiner

RARE-EARTH-ACTIVATED PHOSPHORS

RELATED APPLICATIONS

This application is a national stage filing under 35 U.S.C. §371 of PCT International application PCT/GB99/04299, filed Dec. 17, 1999, which was published under PCT Article 21(2) in English. Foreign priority benefits are claimed under 35 U.S.C. §119(a)-(d) or 35 U.S.C. §365(b) of Great Britain application number GB 9911781.4, filed May 20, 1999 and Great Britain application number GB 9827860.9, filed Dec. 17, 1998.

The present invention relates to rare earth activated phosphors. Such phosphors are known to possess excellent light output and colour rendering properties and have been utilized successfully in many display technologies. One particularly successful material, europium activated yttrium oxide ($Y_2O_3$:$Eu^{3+}$), has shown particular promise in the field of field emission display; yttrium oxide acts as a host for the $Eu^{3+}$ or dopant ion.

The successful introduction of field emitting displays is dependent upon the availability of low voltage phosphors. As the phosphor exciting electrons have a comparatively low energy (less than 2 kV) as compared to conventional phosphors and one must avoid the use of sulphur to reduce contamination, new types of material have to be used. In particular, it is desirable to be able to make the phosphor particles without a surface dead layer which occurs when fine particles are prepared using a conventional grinding technique. This dead layer is an important source of non-radiative luminescence routes for low energy electrons.

According to the present invention there is provided a process for preparing phosphor particles of a host oxide doped with a rare earth or manganese without the need for a grinding technique which comprises:

preparing an aqueous solution of salts of the host ion and of the dopant ion and a water soluble compound which decomposes under the reaction conditions to convert said salts into hydroxycarbonate, heating the solution so as to cause said compound to decompose, recovering the resulting precipitate and calcining it at a temperature of at least 500° C.

The water-soluble compound which decomposes under the reaction condition is typically urea, which is preferred, or a weak carboxylic acid such as oxalic acid or tartaric acid. The urea and other water soluble compounds slowly introduce $OH^-$ ligands into the solution until the solubility limit has been reached. When the urea decomposes it releases carbonate and hydroxide irons which control the precipitation. If this is done uniformly then particles form simultaneously at all points and growth occurs within a narrow size distribution.

The nature of the salts of the host and dopant ions is not particularly critical provided that they are water soluble. Typically, the salts are chlorides, but, for instance, a perchlorate can also be used.

The host ion is typically a metal which is generally trivalent such as yttrium, gadolinium, gallium, lanthanum, lutetium, and tantalum as well as aluminium. The dopant ion is generally a rare earth such as europium (red), terbium (green), cerium (blue/violet), thulium (blue) and dysprosium (white) as well as erbium (infra-red), neodymium (infra-red), samarium (orange), praseodymium (white) and holmium (blue). It can also be manganese. In contrast to electron emitters, such ions are desirable for good luminescence properties.

In our GB Application No. 9827859.1 we describe and claim ternary phosphor particles having the formula:

$Z_zX_xO_y$:RE where Z is a metal of valency b, X is a metal or metalloid of valency a, such that 2y=b.z+a.x, and RE is a dopant ion of terbium, europium, cerium, thalium, samarium, holmium, erbium, dysprosium, praseodymium or manganese, having a size not exceeding 1 micron, which can be prepared in an analogous manner.

The reaction is carried out at elevated temperature so as to decompose the water soluble compound. For urea, the lower temperature limit is about 70° C.; the upper limit of reaction is generally 100° C.

Doping with the "rare earth" metal salt can be carried out by adding the required amount of the dopant ion, typically from 0.1 to 30%, generally from 1 to 10%, for example about 5% (molar).

The reaction mixture can readily be obtained by mixing appropriate amounts of aqueous solutions of the salts and adding the decomposable compound.

It has been found that rather than start the process by dissolving salts of the desired elements there are advantages to be obtained by preparing the salts in situ by converting the corresponding oxides to these salts. Apart from the fact that oxides are generally significantly cheaper than corresponding chlorides or nitrates, it has also been found that cathodoluminescence of the resulting particles can be superior.

It has been found that better results can generally be obtained by keeping the reaction vessel sealed. This has the effect of narrowing the size distribution of the resulting precipitate.

An important feature of the process is that decomposition takes place slowly so that the compounds are not obtained substantially instantaneously as in the usual precipitation techniques. Typically for urea, the reaction is carried out at, say, 90° C. for one to four hours, for example about 2 hours. After this time precipitation of a mixed amorphous/nanocrystalline phase is generally complete. This amorphous stage should then be washed and dried before being calcined. Decomposition of urea starts at about 80° C. It is the temperature which largely controls the rate of decomposition.

Calcination typically takes place in a conventional furnace in air but steam or an inert or a reducing atmosphere such as nitrogen or a mixture of hydrogen and nitrogen can also be employed. It is also possible to use, for example, a rapid thermal annealer or a microwave oven. The effect of using such an atmosphere is to reduce any tendency the rare earth element may have from changing from a 3+ ion to a 4+ ion. This is particularly prone in the case of terbium and cerium as well as $Eu^{2+}$. The use of hydrogen may also enhance the conductivity of the resulting crystals.

Calcination generally requires a temperature of at least 500° C., for example 600° C. to 900° C., such as about 650° C. It has been found that by increasing the calcination temperature the crystallite size increases. Indeed it is possible to produce monocrystals having a larger particle size by this process. It has also been found that by increasing the crystallite size of the resulting particles the luminescence of the particles is enhanced.

In general it has been found that grain growth becomes significant once the temperature reaches 1000° C. While there is a small improvement in crystallite size when using 900° C. rather than 600° C. this is relatively insignificant compared with the increases which occur once the temperature is raised to 1000° C. or above. In general the temperature required is at least from one third to half the bulk melting point of the oxide (the Tamman temperature) which is typically of the order of 2500° C. Best results are generally obtained towards the upper end of this range.

Time also plays a part and, in general, at higher temperatures a shorter time can be used. In general the calcination is carried out at a temperature and time sufficient to produce a crystallite size of at least 35 nm, generally at least 50 nm.

The time of calcination is generally from 30 minutes to 10 hours and typically from 1 hour to 5 hours, for example about 3 hours. A typical calcination treatment involves a temperature of at least 1050° C., e.g. 1150° C. for 3 hours while at lower temperatures a time from 3 to 6 hours is typical. In general, temperatures above 1300 to 1400° C. are not needed. In order to augment crystallite size it is possible to incorporate flux agents which act as grain boundary promoters such as titania, bismuth oxides, silica, lithium fluoride and lithium oxide.

While, in the past, using lower temperatures of calcination, crystallite sizes of the order of 20 nm are obtained it has been found, according to the present invention, that crystallite sizes of at least 50 nm are regularly obtainable. Indeed crystallite sizes as much as 200 nm can be obtained without difficulty. As the temperature of calcination increases the particles have a tendency to break up into single or monocrystalline particles. If the calcination takes place for too long there is a danger that the particles will not disperse. Obviously the particle size desired will vary depending on the particular application of the phosphors. In particular the acceleration voltage affects the size needed such that at 300 volts a crystallite size of the order of 50 nm is generally suitable.

The urea or other decomposable compound should be present in an amount sufficient to convert the salts into hydroxycarbonate. This means that the mole ratio of e.g. urea to salt should generally be at least 1:1. Increasing the amount of urea tends to increase the rate at which hydroxycarbonate is formed. If it is formed too quickly the size of the resultant particles tends to increase. Better results are usually obtained if the rate of formation of the particles is relatively show. Indeed in this way substantially monocrystalline particles can be obtained. In general the mole ratio of urea or other decomposable compound to salt is from 1:1 to 10:1, for example from 1:1 to 8:1, say 2:1 to 6:1 or typically 2:1 to 5:1, for example about 3:1; although higher ratios may be desirable if the initial solution is acidic and sometimes they improve yield. Typically the pH will be from about 0.5 to 2.0 although somewhat different values may be used if the salt is formed in situ. In general, the effect of the mole ratio on crystallite size is insignificant when the calcination temperature exceeds 1000° C.

The substantially monocrystalline particles form another aspect of the present invention. The present invention accordingly also provides substantially monocrystalline particles having the formula:

$$Z_zO_y: RE$$

where Z is a metal of valency a, such that $2y=a.z$ and RE is a dopant ion of a rare earth metal or manganese. Typical examples of Z and RE have been given above.

By "substantially monocrystalline" is meant that particles form a single crystal although the presence of some smaller crystals dispersed in the matrix of the single crystal is not excluded.

The particles obtained by the process of the present invention generally have a particle size not exceeding 1 micron and typically not exceeding 300 nm, for example from 50 to 150 nm and, as indicated above, they are preferably monocrystalline.

The particles of the present invention are suitable for use in FED type displays. For this purpose the particles can be embedded in a suitable plastics material by a variety of methods including dip coating, spin coating and meniscus coating or by using an air gun spray. Accordingly, the present invention also provides a plastics material which incorporates particles of the present invention.

Suitable polymers which can employed include polyacrylic acid, polystyrene and polymethyl methacrylate. Such plastics materials can be used for photoluminescence applications and also in electroluminescence applications where an AC current is to be employed. If a DC current is employed then conducting polymers such as polyvinylcarbazole, polyphenylenevinylidene and polymethylphenylsilane can be employed. Poly 2-(4-biphenylyl)-5-(4-tertiarybutyl phenyl)-1,3,4-oxidiazole (butyl-PBD) can also be used. Desirably, the polymer should be compatible with the solvent employed, typically methanol, in coating the plastics material with the particles.

Typically, the particles will be applied to a thin layer of the plastics material, typically having a thickness from 0.5 to 15 microns.

The maximum concentration of particles is generally about 35% by weight with 65% by weight of polymer. There is a tendency for the polymer to crack if the concentration exceeds this value. A typical minimum concentration is about 2% by weight (98% by weight polymer). If the concentration is reduced below this value then "holes" tend to form in the plastics material.

The following Examples further illustrate the present invention.

EXAMPLE 1

Figure 1:
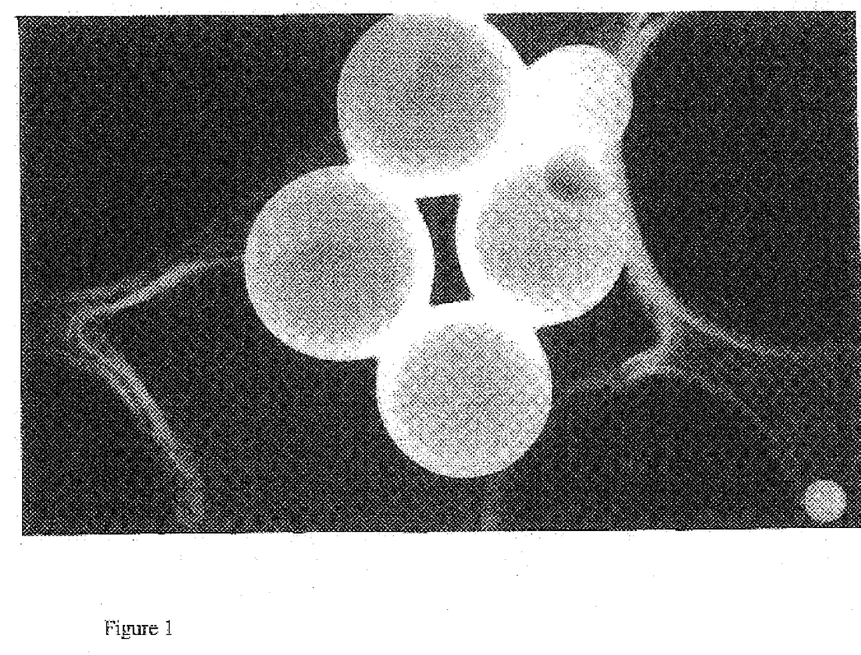
FIG. 1 is an electron micrograph of the particles of example 1 ($Gd_2O_3$: 1% $Eu^{3+}$) before calcination.
Figure 1B:
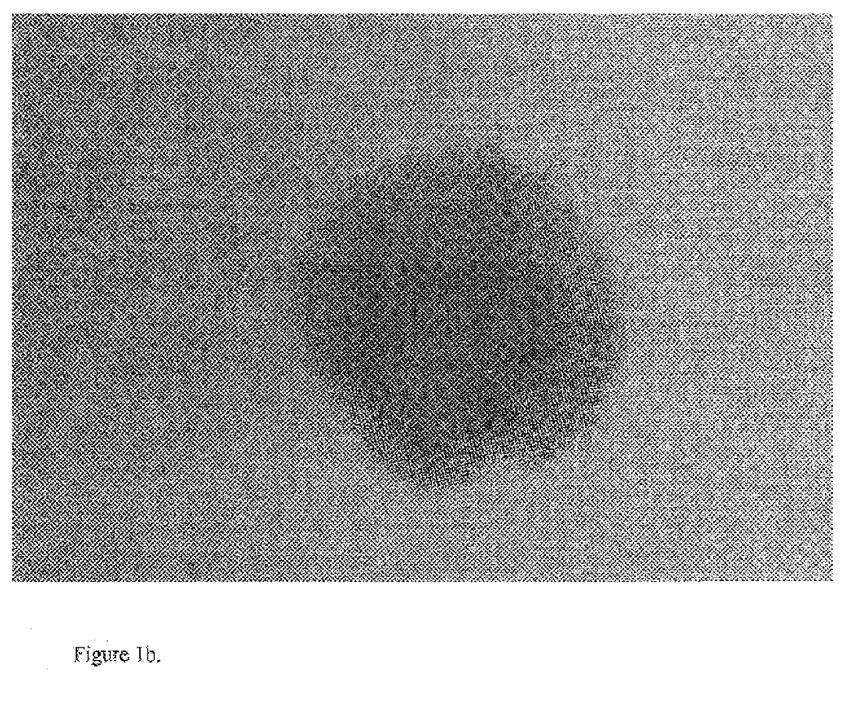
FIG. 1b is an electron micrograph of the particles of example 1 ($Gd_2O_3$:1% $Eu^{3+}$) after-calcination.

The process was used to prepare $Gd_2O_3$: 1% $Eu^{3+}$. This was prepared following the procedure outlined above from gadolinium chloride and europium chloride using urea as the decomposable compound. The solution was heated to 90° C. for 2 hours in a sealed container after which time a precipitate was observed. Under examination under an electron microscope this precipitate was found to consist of spherical particles of size 200–400 nm. These particles were then calcined. FIG. 1 of the accompanying drawings shows (scale 15 mm=100 nm) the amorphous spheres before calcination. The seed nanocrystals will be noted in the centre of each of the particles. In FIG. 1b (scale 13 mm=10 nm) the same phosphor after calcination is shown. The particle will be noted as a single crystal and there is no evidence of either a surface region or substantial defects. This is the key to efficient light emission from such particles. After calcination the particles were 50 to 150 nm in size. The final particles displayed a photoluminescence spectrum which is typical of the red emission observed from $Eu^{3+}$ ions.

EXAMPLE 2

Figure 2:
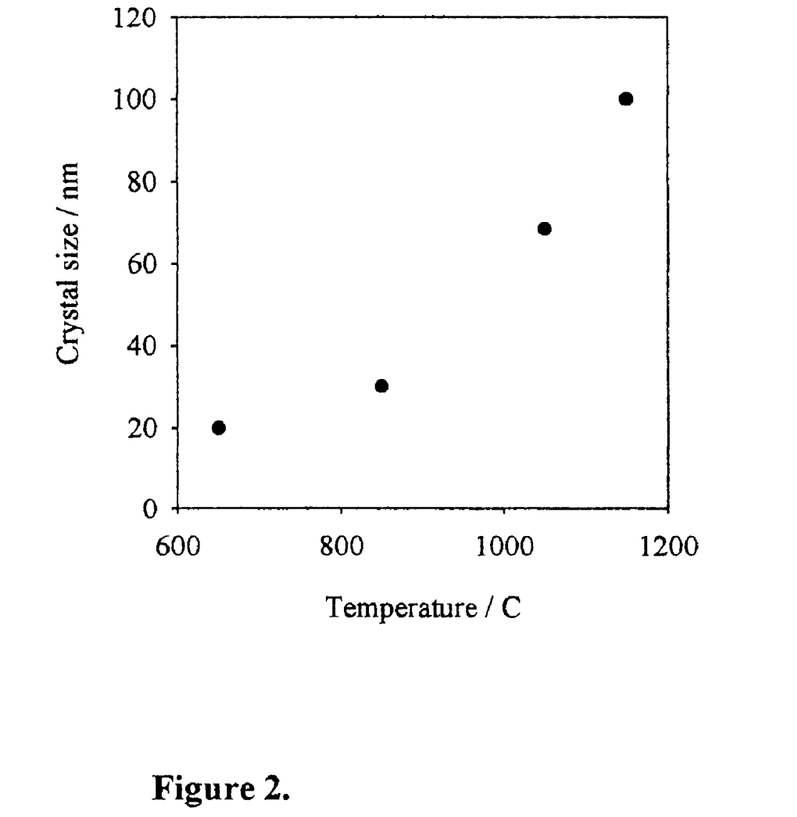
FIG. 2 is a graph showing the affect of temperature on crystal size.
Figure 10:
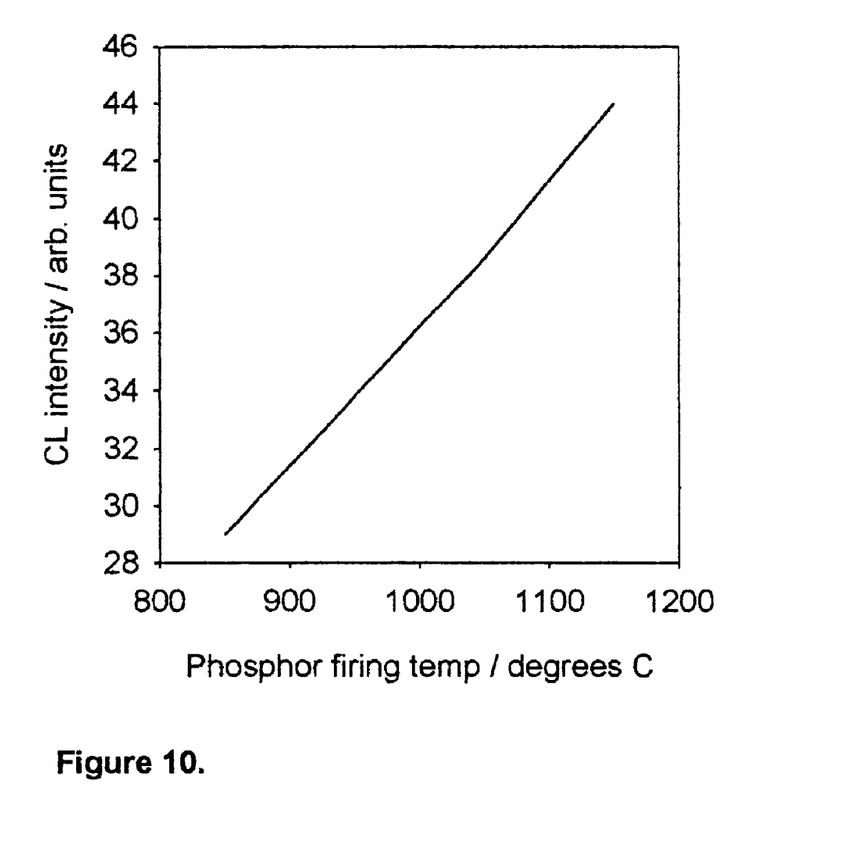

Particles from the precipitate obtained in Example 1 were used. A standard sample of $Y_2O_3:Eu^{3+}$ calcined at 650° C. is tested against further phosphor particles calcined at 850° C., 1050° C., and 1150° C., for 3 hours in each case. FIG. 2 shows the growth in crystal size with temperature. The increase in cathodoluminescenr (CL) intensity with calcination temperature is shown in FIG. 10. It can be seen that the luminescence intensity increases by a factor of 50% with an increase in the firing temperature of 300° C.

Figure 3:
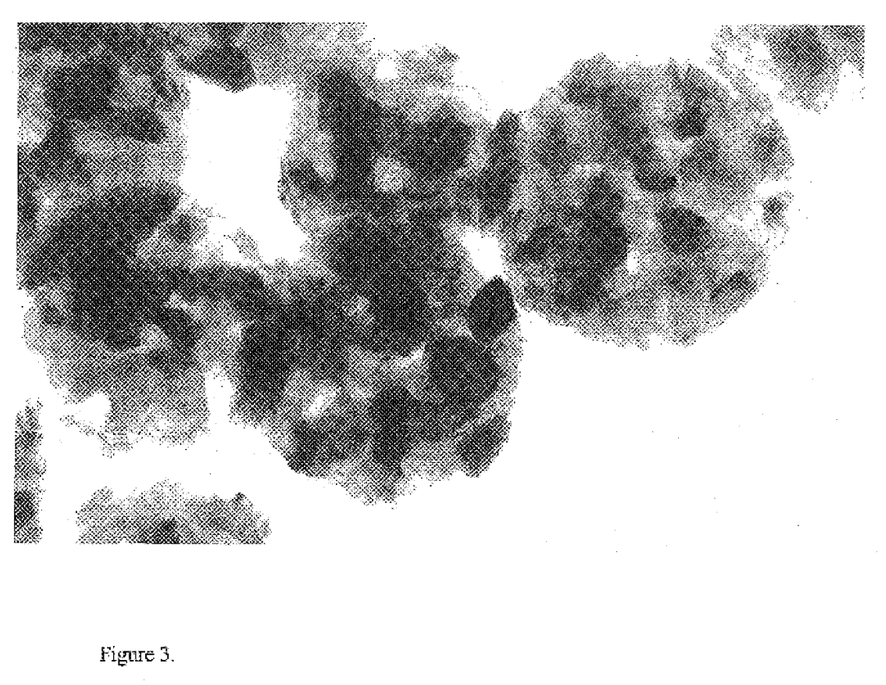
FIG. 3 is an electron micrograph of particles of Example 2 ($Y_2O_3$:$Eu^{3+}$) calcined at 650° C.
Figure 4:
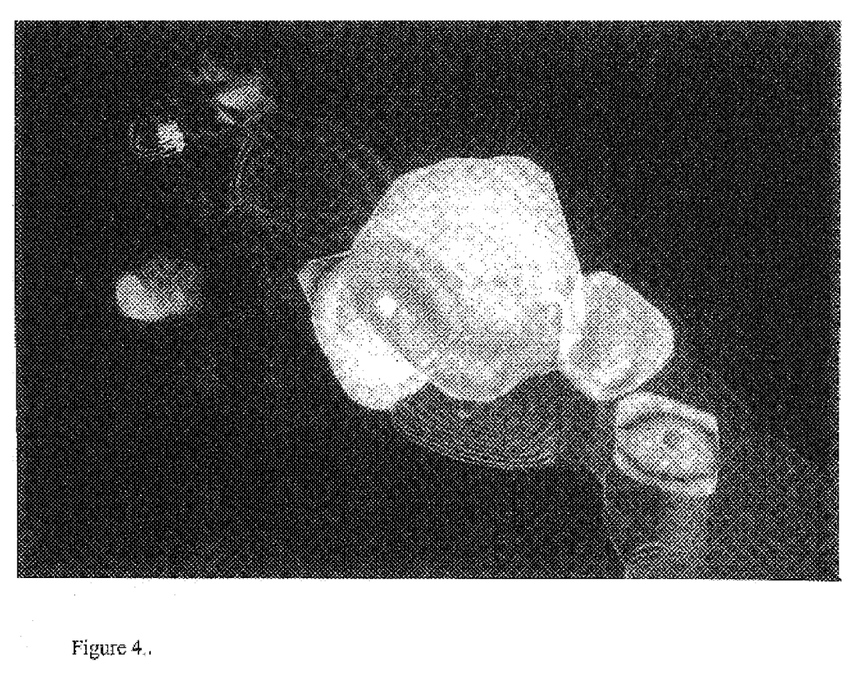
FIG. 4 is an electron micrograph of particles of Example 2 after calcination at 1150° C.
Figure 5:
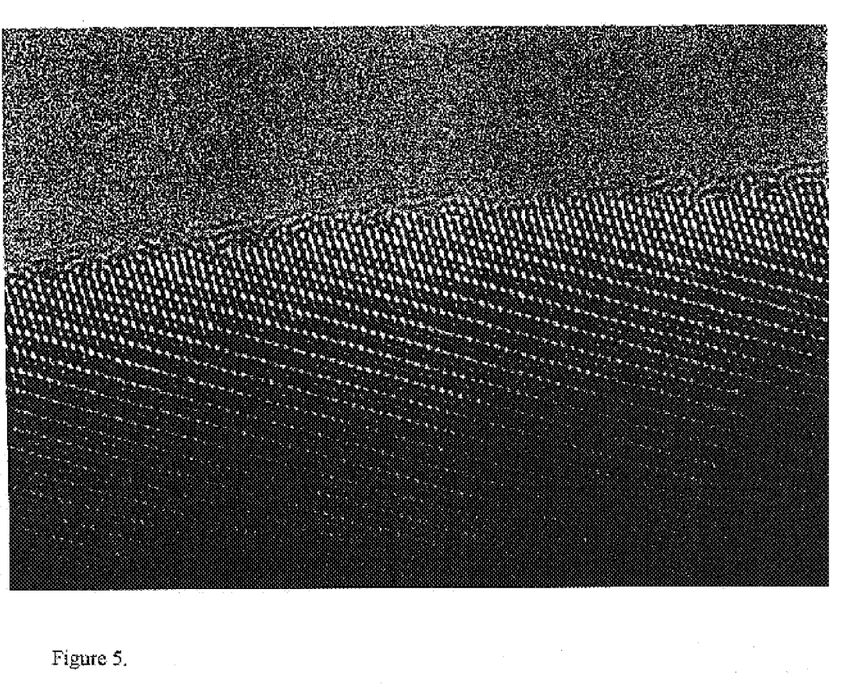
FIG. 5 is a high resolution image of the particles shown in FIG. 4.

Two electron micrographs are shown in FIGS. 3 and 4. The particles are imaged in dark field mode, that is strongly diffracting crystallites appear bright in the figures. It can be seen that whereas the sample calcined at 650° C. (FIG. 3) is a spherical collection of particles of 10–25 nm size range (scale 35 mm=100 nm), when calcined at 1150° C. this is transformed to single crystal material of size range 75–150 nm as shown in FIG. 4 (scale 30 mm=100 nm). The crystals do not exhibit any defect structure, either surface or bulk. High resolution images of the particles surfaces (see FIG. 5; scale 13 mm=1 nm) show that there is no defect/surface dead layer associated with the particles.

Figure 6:
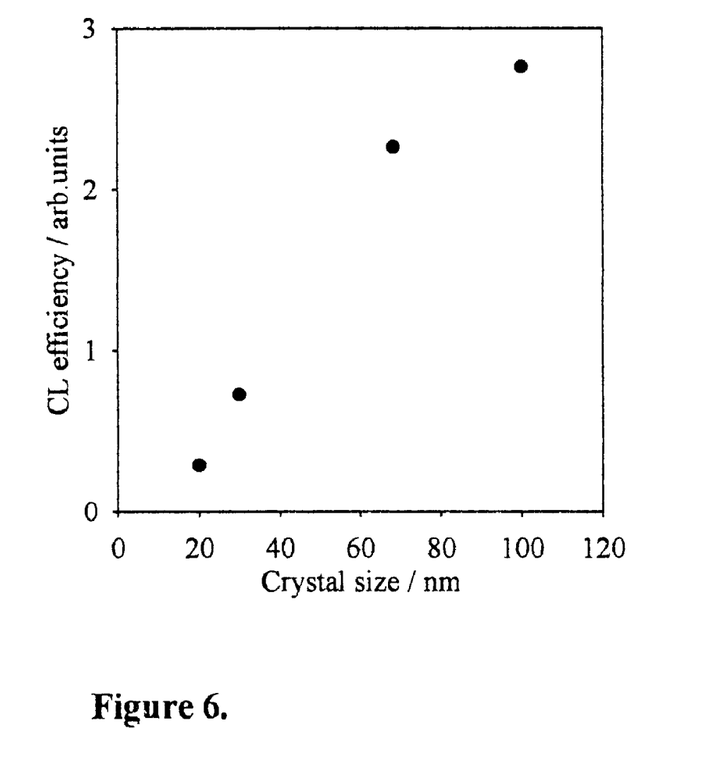
FIG. 6 is a graph showing the effect of crystal size on cathodoluminescence efficiency.

The growth in crystal size improves cathodoluminescence efficiency as shown in FIG. 6. It can be seen that luminescence efficiency increases by an order of magnitude as the firing temperature is increased to 1150° C.

Figure 7:
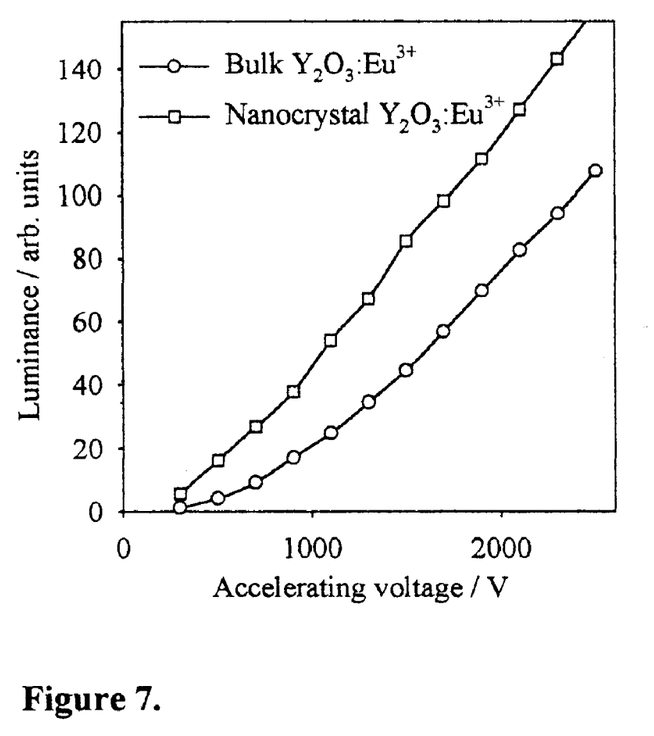
FIG. 7 is a graph comparing the particles of example 2 with those of a conventional $Y_2O_3$:$Eu^{3+}$ for luminescence efficiency.

If one compares the phosphor performance against a conventionally formed $Y_2O_3:Eu^{3+}$ phosphor (supplied by Phosphor Technology Ltd) of grain size 3.5 μm the material of this Example shows superior efficiency. As shown in FIG. 7, the crystalline material is three times as efficient as the conventional material in the sub-700V range and 50% more efficient at 2–2.5 kV.

EXAMPLE 3

6 g Yttria and 0.46 g europia are added to 60 ml 6M HCl and heated to 70° C. for 30 min whereupon the solution goes clear. To this is added approximately 30 ml 10M KOH in order to adjust the pH to 2.3.

60 ml 13M urea is added and the temperature raised to 90° C. and kept at this temperature for 2 hours. The resulting precipitate was then fired at 1150° C. for 3 hours.

From this solution 4.5 g of precursor and 2.5 g of phosphor are recovered.

EXAMPLE 4

Figure 8:
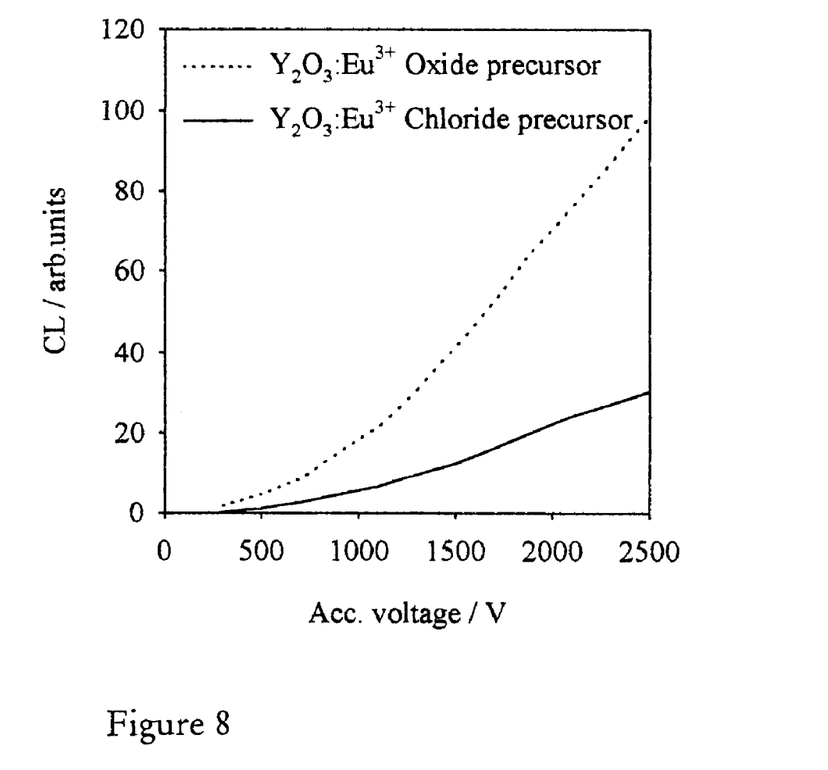
FIG. 8 illustrates the cathodoluminescence efficiency comparing the use of an oxide precursor with a chloride precursor.

Samples of chloride precursor for $Y_2O_3:Eu$ and oxide precursor material of Example 3 are compared at identical loading. FIG. 8 shows a CL efficiency increase of a factor of three when the oxide precursor is used (loading 1.3 mgcm⁻²).

EXAMPLE 5

Figure 9:
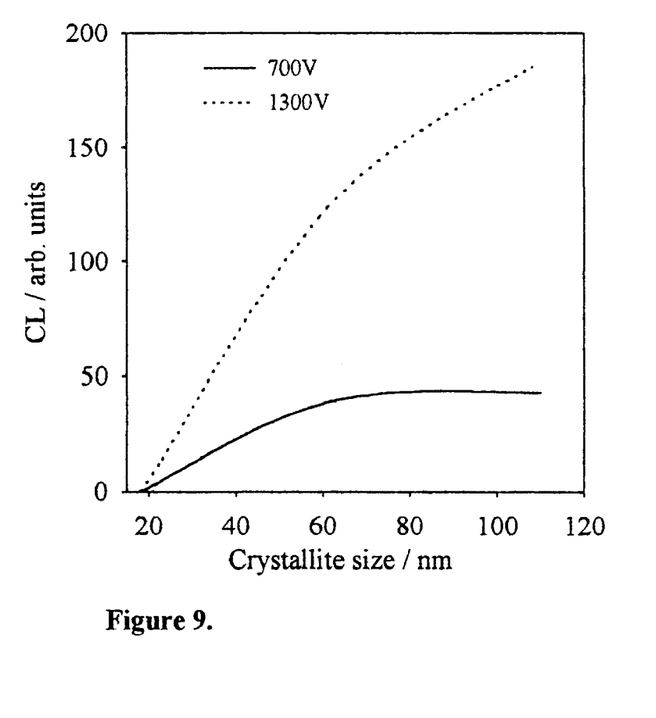
FIG. 9 is a graph showing the effect of different crystallite sizes on $Y_2O_3$:Eu on the cathodoluminescence at two different voltages, 700 volts and 1300 volts.

$Y_2O_3:Eu$ material having different crystallite sizes from the preceding Examples was tested at two different voltages and the CL determined. The results obtained are shown in FIG. 9. It appears that the saturation point of the CL intensity increases to a larger crystallite size as the accelerating voltage is increased. It may be, therefore, that smaller crystallite sizes are preferred for lower voltages.

What is claimed is:

1. Substantially monocrystalline particles having the formula:

$$Z_zO_y:RE$$

where Z is a metal of valency a, such that 2y=a.z and RE is a dopant ion of a rare earth metal or manganese.

2. Particles according to claim 1 having one or more features selected from the group consisting of: a concentration of dopant of 1 to 10%; an yttrium, gadolinium, gallium or tantalum host ion; an europium, terbium, or manganese dopant ion; and a particle size of from 50 to 150 nm.

3. Particles according to claim 1 in which Z is not yttrium when RE is europium.

4. A process for preparing phosphor particles of a host oxide doped with a rare earth or manganese which comprises:

preparing an aqueous solution of salts of the host ion and of the dopant ion and a water soluble compound which decomposes under reaction conditions to convert said salts into hydroxycarbonate, the mole ratio of salt to water soluble compound being from 1:1 to 8:1, heating the solution so as to cause said compound to decompose with the formation of a precipitate, and recovering the resulting precipitate and calcining it at a temperature greater than 1000° C.

5. A process for preparing phosphor particles of a host oxide doped with a rare earth or manganese which comprises:

preparing an aqueous solution of salts of the host ion and of the dopant ion and a water soluble compound which decomposes under reaction conditions to convert said salts into hydroxycarbonate, heating the solution so as to cause said compound to decompose with the formation of a precipitate, and recovering the resulting precipitate and calcining it at a temperature greater than 1000° C.

6. A process according to claim 5 in which at least one of the salts is a chloride.

7. A process according to claim 5 in which the salts are formed in situ from the corresponding oxides and the corresponding acid.

8. A process according to claim 1 in which the said water soluble compound is urea or oxalic acid.

9. A process according to claim 4 in which the solution is heated to a temperature of 70 to 100° C.

10. A process according to claim 8 in which the mole ratio of urea to salt is from 1:1 to 8:1.

11. A process according to claim 5 in which the dopant is added in an amount to provide a concentration of 1 to 10% in the particles.

12. A process according to claim 5 in which the heating step is carried out in a sealed vessel.

13. A process according to claim 5 in which the calcination takes place in air or a reducing atmosphere.

14. A process according to claim 13 in which the calcination takes place at a temperature of at least half the Tamman temperature of the host oxide.

15. A process according to claim 14 in which the calcination takes place at a temperature of at least 1050° C. for 1 to 5 hours.

16. A process according to claim 5 in which the host ion is yttrium, gadolinium, gallium or tantalum.

17. A process according to claim 5 in which the dopant ion is europium, terbium, or manganese.

18. A process according to claim 5 in which the particles are substantially monocrystalline.

19. A process according to claim 5 in which the particles have a size from 50 to 150 nm.

20. Phosphor particles prepared by a process as claimed in claim 5.

21. A plastics material which comprises particles as claimed in claim 20.

22. A plastics material according to claim 21 which is 0.5 to 15 microns thick.

23. A plastics material according to claim 21 which contains 2 to 35% by weight of the particles based on the weight of the material.

24. A plastics material according to claim 21 which is made of an electrically conducting polymer.

25. A plastics material according to claim 21 which is made of polyacrylic acid, polymethylmethacrylate or polystyrene.

* * * * *